(12) United States Patent
Sugiura et al.

(10) Patent No.: US 10,119,343 B2
(45) Date of Patent: Nov. 6, 2018

(54) INDUCTIVE COUPLING

(71) Applicant: SANVEAN TECHNOLOGIES LLC, Katy, TX (US)

(72) Inventors: Junichi Sugiura, Bristol (GB); Stephen Jones, Cypress, TX (US)

(73) Assignee: SANVEAN TECHNOLOGIES LLC, Katy, TX (US)

( * ) Notice: Subject to any disclaimer, the term of this patent is extended or adjusted under 35 U.S.C. 154(b) by 114 days.

(21) Appl. No.: 15/174,813

(22) Filed: Jun. 6, 2016

(65) Prior Publication Data
US 2017/0350197 A1   Dec. 7, 2017

(51) Int. Cl.
| E21B 17/03 | (2006.01) |
| --- | --- |
| E21B 47/00 | (2012.01) |
| E21B 17/02 | (2006.01) |
| H02J 50/12 | (2016.01) |
| H02J 50/40 | (2016.01) |
| E21B 17/10 | (2006.01) |
| E21B 17/042 | (2006.01) |

(52) U.S. Cl.
CPC .......... *E21B 17/028* (2013.01); *E21B 17/042* (2013.01); *E21B 17/1078* (2013.01); *E21B 47/00* (2013.01); *H02J 50/12* (2016.02); *H02J 50/40* (2016.02)

(58) Field of Classification Search
CPC ...... E21B 7/028; E21B 17/003; E21B 17/206; H02J 50/12; H02J 50/40
See application file for complete search history.

(56) References Cited

U.S. PATENT DOCUMENTS

| | | |
|---|---|---|
| 4,777,652 A | 10/1988 | Stolarczyk |
| 5,688,160 A | 11/1997 | Pozzetti et al. |
| 5,803,186 A | 9/1998 | Berger et al. |
| 5,957,221 A | 9/1999 | Hay et al. |
| 6,047,239 A | 4/2000 | Berger et al. |
| 6,148,933 A | 11/2000 | Hay et al. |
| 6,157,893 A | 12/2000 | Berger et al. |
| 6,247,542 B1 | 6/2001 | Kruspe et al. |
| 6,446,736 B1 | 9/2002 | Kruspe et al. |
| 6,540,032 B1 | 4/2003 | Krueger et al. |
| 6,637,524 B2 | 10/2003 | Kruspe et al. |
| 6,672,169 B2 | 1/2004 | Clymer et al. |
| 6,700,947 B2 | 3/2004 | Oshima et al. |
| 6,727,696 B2 | 4/2004 | Kruspe et al. |
| 6,739,409 B2 | 5/2004 | Kruspe et al. |
| 6,913,095 B2 | 7/2005 | Krueger |
| 7,083,006 B2 | 8/2006 | Kruspe et al. |
| 7,117,733 B2 | 10/2006 | Engels et al. |
| 7,140,435 B2 | 11/2006 | Defretin et al. |
| 7,193,414 B2 | 3/2007 | Kruspe et al. |
| 7,304,559 B2 | 12/2007 | Foertsch et al. |

(Continued)

OTHER PUBLICATIONS

International Search Report and Written Opinion issued in PCT/US2017/035910, dated Sep. 1, 2017 (6 pages).

*Primary Examiner* — Cathleen R Hutchins
(74) *Attorney, Agent, or Firm* — Adolph Locklar

(57) ABSTRACT

An inductive coupler includes a first transceiver electrically coupled to a first coil through a first tuning circuit. The inductive coupler may also include a second transceiver electrically coupled to a second coil through a second tuning circuit, where the second coil is positioned substantially concentric with the first coil.

12 Claims, 9 Drawing Sheets

(56) References Cited

U.S. PATENT DOCUMENTS

| | | |
|---|---|---|
| 7,400,262 B2 | 7/2008 | Chemali et al. |
| 7,477,161 B2 | 1/2009 | MacPherson et al. |
| 7,518,528 B2 | 4/2009 | Price et al. |
| 7,556,105 B2 | 7/2009 | Krueger |
| 7,565,833 B2 | 7/2009 | Gillen et al. |
| 7,708,086 B2 | 5/2010 | Witte |
| 7,775,275 B2 | 8/2010 | Patel |
| 7,817,062 B1 | 10/2010 | Li et al. |
| 7,900,699 B2 | 3/2011 | Ramos et al. |
| 7,913,773 B2 | 3/2011 | Li et al. |
| 8,018,324 B2 | 9/2011 | Penick et al. |
| 8,056,619 B2 | 11/2011 | Patel et al. |
| 8,074,713 B2 | 12/2011 | Ramos et al. |
| 8,102,276 B2 | 1/2012 | Sugiura |
| 8,134,476 B2 | 3/2012 | Chemali et al. |
| 8,151,907 B2 | 4/2012 | MacDonald |
| 8,169,302 B2 | 5/2012 | Penick et al. |
| 8,248,266 B2 | 8/2012 | MacPherson et al. |
| 8,258,976 B2 | 9/2012 | Price et al. |
| 8,284,075 B2 | 10/2012 | Fincher et al. |
| 8,350,653 B2 | 1/2013 | Rhodes et al. |
| 8,554,136 B2 | 10/2013 | McCormack |
| 8,567,524 B2 | 10/2013 | Schimanski et al. |
| 8,811,526 B2 | 8/2014 | McCormack et al. |
| 8,903,243 B2 | 12/2014 | Ullah |
| 8,981,958 B2 | 3/2015 | Price et al. |
| 9,007,233 B2 | 4/2015 | Sugiura |
| 9,048,959 B2 | 6/2015 | Voutilainen et al. |
| 2005/0087368 A1* | 4/2005 | Boyle .................. E21B 17/023 175/57 |
| 2005/0145406 A1 | 7/2005 | Hall et al. |
| 2012/0090827 A1 | 4/2012 | Sugiura |
| 2013/0181799 A1 | 7/2013 | Deville et al. |
| 2014/0083773 A1 | 3/2014 | Minosyan et al. |
| 2014/0084946 A1* | 3/2014 | Clark .................... G01N 27/02 324/654 |
| 2014/0353035 A1 | 4/2014 | Sugiura et al. |

\* cited by examiner

INDUCTIVE COUPLING

TECHNICAL FIELD/FIELD OF THE DISCLOSURE

The present disclosure relates to data and/or electrical power transmission in a downhole tool.

BACKGROUND OF THE DISCLOSURE

When drilling a wellbore, data may be communicated between subcomponents of a downhole tool. Because subcomponents may be located in different structures of the downhole tool, direct data connections may be difficult to configure. Additionally, the downhole environment may cause wear or damage to mechanical electrical connections. Mechanical connections such as rotary connectors may be expensive and may fail in the downhole environment. Mechanical connections may also wear over time, requiring maintenance operations to be performed. Mechanical connections may also be susceptible to fluid contamination.

For example, in a rotary steerable system (RSS), data may be communicated between subcomponents of the RSS located in rotating components of the bottomhole assembly and subcomponents of the RSS located in nonrotating components of the bottomhole assembly.

SUMMARY

The disclosure provides for an inductive coupler. The inductive coupler includes a first transceiver electrically coupled to a first coil through a first tuning circuit. The inductive coupler also includes a second transceiver electrically coupled to a second coil through a second tuning circuit, where the second coil is positioned substantially concentric with the first coil.

The disclosure also provides for a downhole tool. The downhole tool includes a collar with a primary collar and an intermediate collar and a probe positioned within the collar. The downhole tool also includes a collar transceiver positioned within the primary collar, the collar transceiver electrically coupled to a male coil through a collar tuning circuit. In addition, the downhole tool includes a probe transceiver positioned within the probe, the probe transceiver electrically coupled to a probe coil through a probe tuning circuit. The downhole tool includes a female coil positioned within the intermediate collar and a collar coil positioned within the intermediate collar. The collar coil is electrically coupled to the female coil through an intermediate tuning circuit.

The disclosure provides for a centralizer for supporting a probe within a collar of a downhole tool. The centralizer includes a centralizer body and an outer coil, the outer coil positioned at an outer surface of the centralizer body. The centralizer also includes an inner coil, the inner coil positioned at an inner surface of the centralizer body, and the inner coil electrically coupled to the outer coil through a centralizer tuning circuit.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
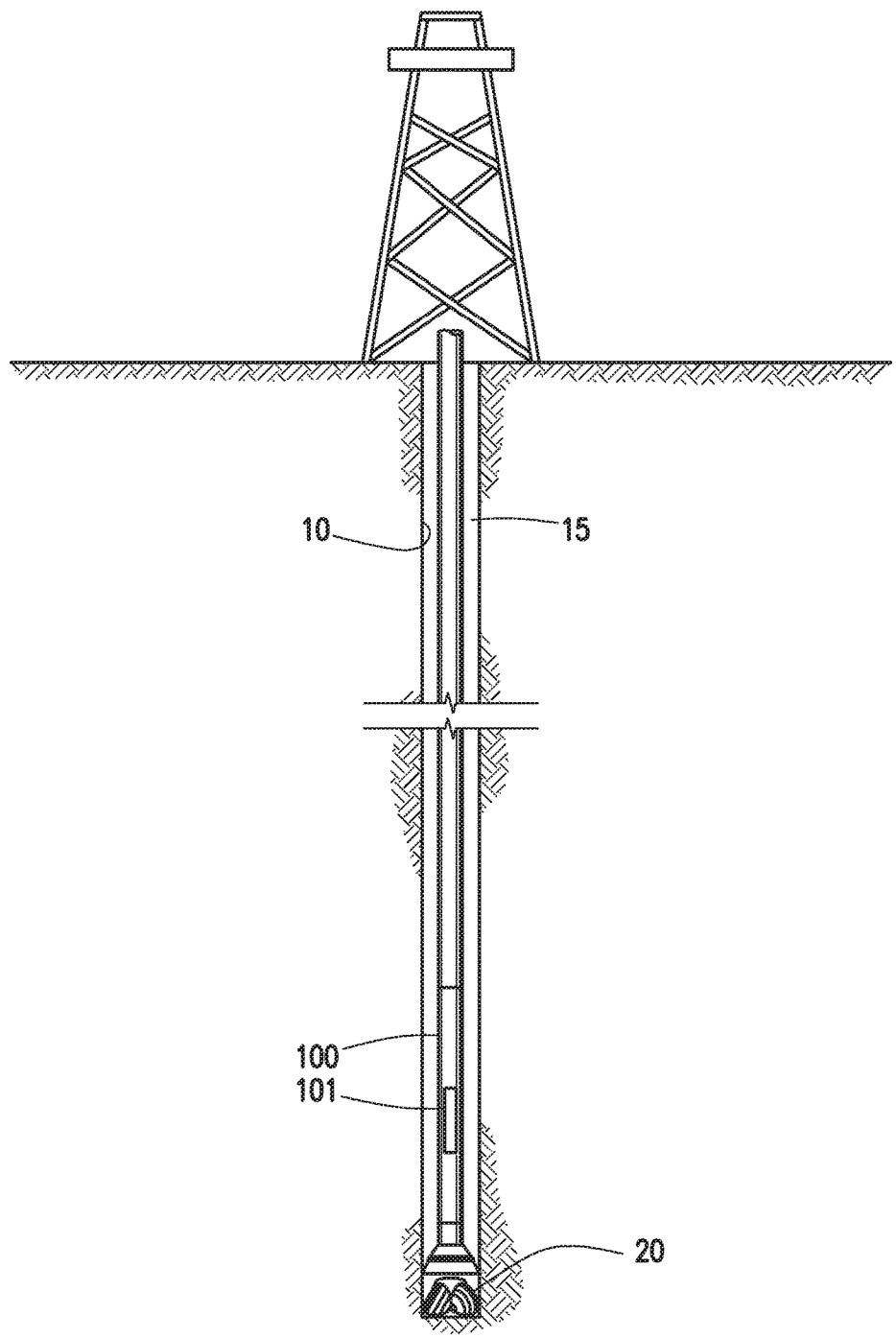
FIG. 1 depicts an overview of a downhole tool in a wellbore.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an overview of a wellbore consistent with at least one embodiment of the present disclosure. Wellbore 10 may be formed by drill string 15. Drill string 15 may include drill bit 20 for forming wellbore 10. In some embodiments, bottomhole assembly 100 may be positioned at the end of drill string 15 within wellbore 10. In some embodiments, bottomhole assembly 100 may include one or more downhole tools 101. Although discussed with respect to drill string 15, one having ordinary skill in the art with the benefit of this disclosure will understand that the present disclosure may be utilized with any downhole tool 101 without deviating from the scope of this disclosure and need not be coupled to a drill string. For example and without limitation, in some embodiments, downhole tool 101 may be positioned within wellbore 10 by a drill string, casing string, wireline, coiled tubing, or any other suitable delivery mechanism.

Figure 2:
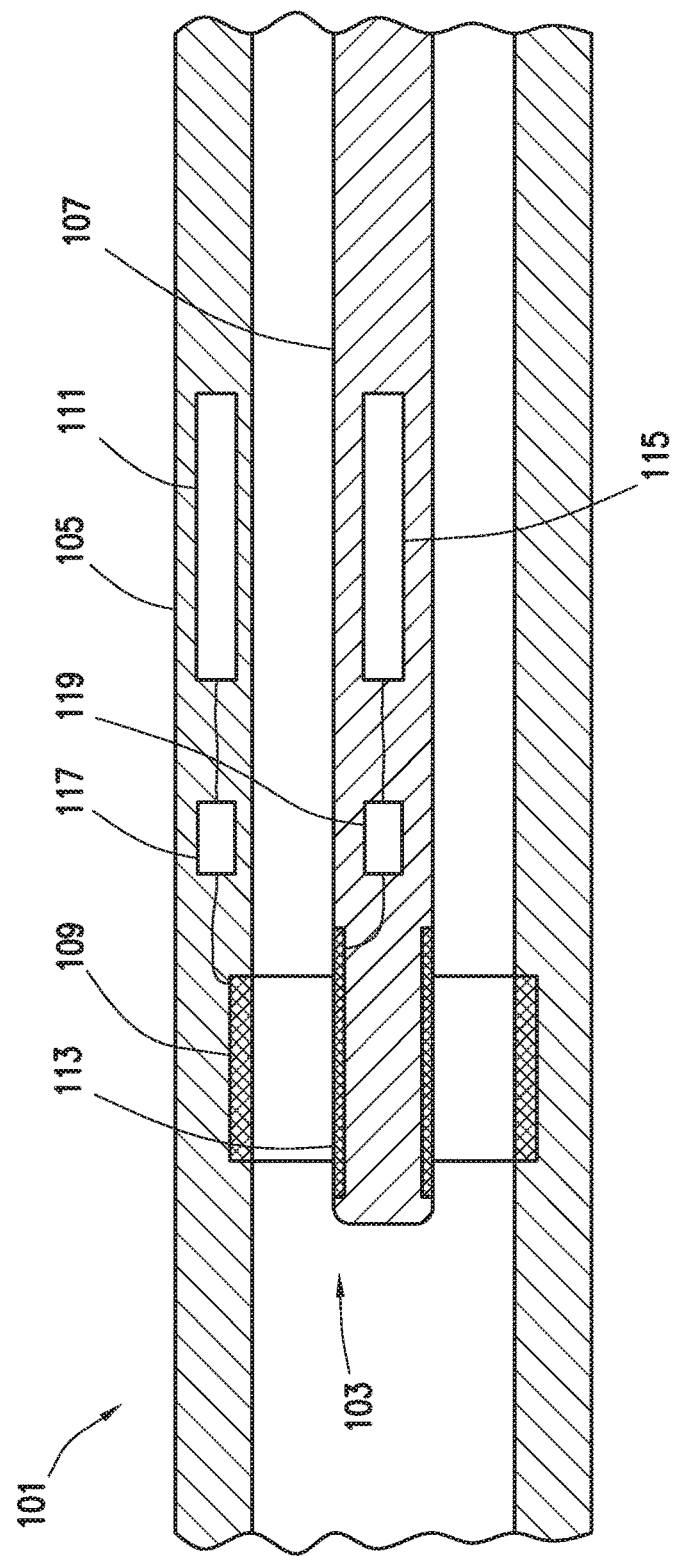
FIG. 2 depicts a cross section view of an inductive coupler consistent with at least one embodiment of the present disclosure.

In some embodiments, as depicted in FIG. 2, inductive coupler 103 may be utilized to transmit data between different subcomponents of downhole tool 101 or between different downhole tools 101. Subcomponent, as used herein, means any portion or subdivision of a tool. For example and without limitation, in some embodiments, inductive coupler 103 may be used to transmit information from collar 105 to probe 107. In some embodiments, collar 105 and probe 107 may be mechanically coupled such that they are rotatable relative to each other. In some embodiments, collar 105 and probe 107 may be mechanically coupled such that they are not rotatable relative to each other. Although described as transmitting between collar 105 and probe 107, one having ordinary skill in the art with the benefit of this disclosure will understand that inductive coupler 103 may be used to transmit data between any two subcomponents of downhole tool 101 or between different downhole tools 101.

With further attention to FIG. 2, in some embodiments, collar 105 may include collar coil 109. Collar coil 109 may be electrically coupled to collar transceiver 111 located in collar 105. In some embodiments, probe 107 may include probe coil 113. Probe coil 113 may be coupled to probe transceiver 115. Transceivers 111 and 115 may be utilized to transmit and receive data transmitted inductively between collar coil 109 and probe coil 113. In some embodiments, collar coil 109 and probe coil 113 may be used for bilateral communication between collar 105 and probe 107. In some embodiments, although described as transceivers 111 and 115, one having ordinary skill in the art with the benefit of this disclosure will understand that one or both of transceivers 111 and 115 may instead be solely a transmitter or receiver which utilizes collar coil 109 and probe coil 113 for unilateral communication between collar 105 and probe 107. In some embodiments, transceivers 111 and 115 may have separate transmitters or receivers.

In some embodiments, collar coil 109 and probe coil 113 may be aligned longitudinally along downhole tool 101. In some embodiments, probe coil 113 may be positioned at least partially radially within collar coil 109. In some embodiments, collar coil 109 and probe coil 113 may be generally coaxial. In some embodiments, collar coil 109 and probe coil 113 may be formed from windings of wire such that when electric current is passed therethrough, a magnetic or electromagnetic field is induced. Likewise, when a magnetic or electromagnetic field is passed through collar coil 109 and probe coil 113, an electric current is generated in the coil. In some embodiments, transceivers 111 and 115 may be electrically coupled to coils 109 and 113 respectively to generate electric current in or receive electric current from coils 109 and 113 to transmit data between collar 105 and probe 107.

In some embodiments, collar coil 109 and probe coil 113 may be positioned away from magnetic or conductive materials. In some embodiments, without being bound to theory, eddy currents induced within magnetic materials may, for example and without limitation, reduce loss in the transmitted electric current. In some embodiments, void spaces between collar coil 109 and components of collar 105 and between probe coil 113 and components of probe 107 may be filled with a material having high magnetic permeability and low electrical conductivity. For example and without limitation, in some embodiments, ferrites may be utilized. Ferrites, as understood in the art, may be ceramic compounds of transition metals with oxygen, which are ferromagnetic but nonconductive. In some embodiments, high-magnetic permeability, low conductivity steel may be used in the void spaces.

Figure 3:
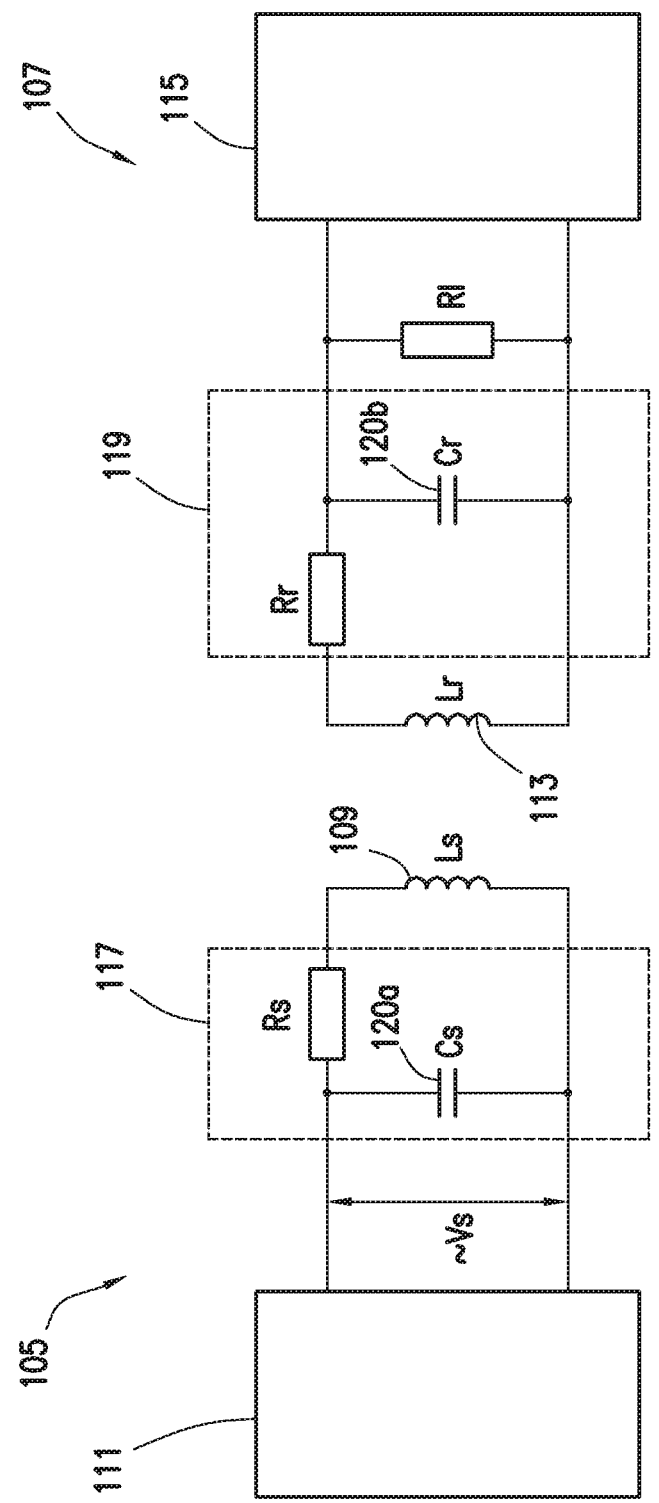
FIG. 3 depicts a schematic view of the inductive coupler of FIG. 2.

In some embodiments, collar transceiver 111 may be electrically coupled to collar coil 109 through collar tuning circuit 117. In some embodiments, probe transceiver 115 may be electrically coupled to probe coil 113 through probe tuning circuit 119. In some embodiments, by including tuning circuits 117 and 119 on both collar 105 and probe 107, inductive coupler 103 may be referred to as "double tuned". In some embodiments, one or more tank circuits or resonant tank circuits may be utilized as tuning circuits 117 and 119. For example, one or more of parallel tank circuits and series tank circuits may be utilized. In certain embodiments, at least one parallel tank circuit and at least one series tank circuit may be used. As depicted in FIG. 3, in some embodiments, tuning circuits 117 and 119 may include one or more components such as capacitors 120*a* and 120*b*. In some embodiments, capacitor 120*a* and collar coil 109 may form a parallel resonant tank circuit. In some embodiments, capacitor 120*b* and collar coil 113 may form a parallel resonant tank circuit. As depicted in FIG. 3, Rs and Rr represent the resistance of capacitors 120*a* and 120*b* and collar coil 109 and probe coil 113 respectively. The resonant frequency of each tuning circuit 117 and 119 may be given by:

$$\omega = \frac{1}{\sqrt{L_1 C_1}} = \frac{1}{\sqrt{L_2 C_2}}$$

where L1 is the inductance of collar coil 109, L2 is the inductance of probe coil 113, C1 is the capacitance of capacitor 120*a* of collar tuning circuit 117 and C2 is the capacitance of capacitor 120*b* of probe tuning circuit 119. By selecting capacitors 120*a* and 120*b* having capacitance based on the inductance values L1 and L2 of coils 109 and 113 respectively, the resonant frequencies of tuning circuits 117 and 119 may be equal or substantially equal, referred to herein as tuning or being tuned. In some embodiments, the resonant frequency of tuning circuits 117 and 119 may be selected such that it corresponds substantially with the expected transmission frequency for data between collar 105 and probe 107. In some embodiments, substantially equal as used herein may mean wherein the resonant frequencies of collar tuning circuit 117 and probe tuning circuit 119 are within 5%, 1%, or 0.1% of each other. In some such embodiments, collar tuning circuit 117 and probe tuning circuit 119 may be tuned at substantially one resonant frequency or one resonant frequency band. In some embodiments, this may be referred to as "single-tuned" circuits. In some embodiments, the tuned frequency may not be limited to one. In some embodiments, collar tuning circuit 117 and probe tuning circuit 119 may be referred to as "dual-tuned", and may, for example and without limitation, include one or more secondary inductors and capacitors, which may allow collar tuning circuit 117 and probe tuning circuit 119 to be tuned at two resonant frequencies (e.g. a lower resonant frequency and higher resonant frequency). In some embodiments, the secondary inductor and capacitor may form, for example and without limitation, a parallel LC trap. In some embodiments, one of the resonant frequencies, for example the lower resonant frequency, may be used to transfer electrical power through inductive coupler 103, while the higher resonant frequency may be used to transfer electrical signals or data. In some embodiments, such a dual-tuned tank circuit may be a combination of parallel and series resonant tanks. In some embodiments, the lower frequency may be, for example and without limitation, 20 Hz, 50 Hz, 60 Hz or 100 Hz. In some embodiments, the higher frequency may be, for example and without limitation, 500 Hz, 1 MHz, or 2 MHz.

In some embodiments, the mutual inductance M between coils 109 and 113 may be given by:

$$M = k\sqrt{L_1 L_2}$$

where k is the coupling coefficient between coils 109 and 113. In some embodiments, by increasing the mutual inductance M, the bandwidth available for data transmission about the resonant frequency of tuning circuits 117 and 119 may be proportional to the mutual inductance M. The coupling coefficient k may be expressed as:

$$k = \frac{M}{\sqrt{L_1 L_2}}$$

In some embodiments, such as for power transfer across inductive coupler 103, the coupling coefficient k may be, for example and without limitation, between 1.0 and 0.7. In some embodiments, such as for signal or data transfer, the coupling coefficient k may be, for example and without limitation, between 0.5 and 0.1. One having ordinary skill in the art with the benefit of this disclosure will understand that the coupling coefficients described herein are not intended to limit the scope of this disclosure. In some embodiments, such as for simultaneous power and signal transfer, additional low-pass filters, high-pass filters, band-pass filters, and/or band-rejection filters may be included. In some embodiments, impedance-matching circuits such as, for example and without limitation, additional transformers, may be used with the dual-tuned circuits.

In some embodiments, the mutual inductance M between two coils may be given by:

$$M = \frac{N_2 \Phi_{21}}{I_1} = \frac{(\mu_0 \pi R_2^2)}{2R_1} N_2$$

where $\mu_0$ is the magnetic constant, $N_2$ is the number of turns in the second coil, $I_1$ is the current in the first coil, R1 is the radius of the first coil, and R2 is the radius of the second coil where the second coil is larger than the first coil. Based on these equations, without being bound to theory, reducing the distance between the first and second coil may, for example and without limitation, increase mutual inductance M and may improve the coupling coefficient.

Figure 4:
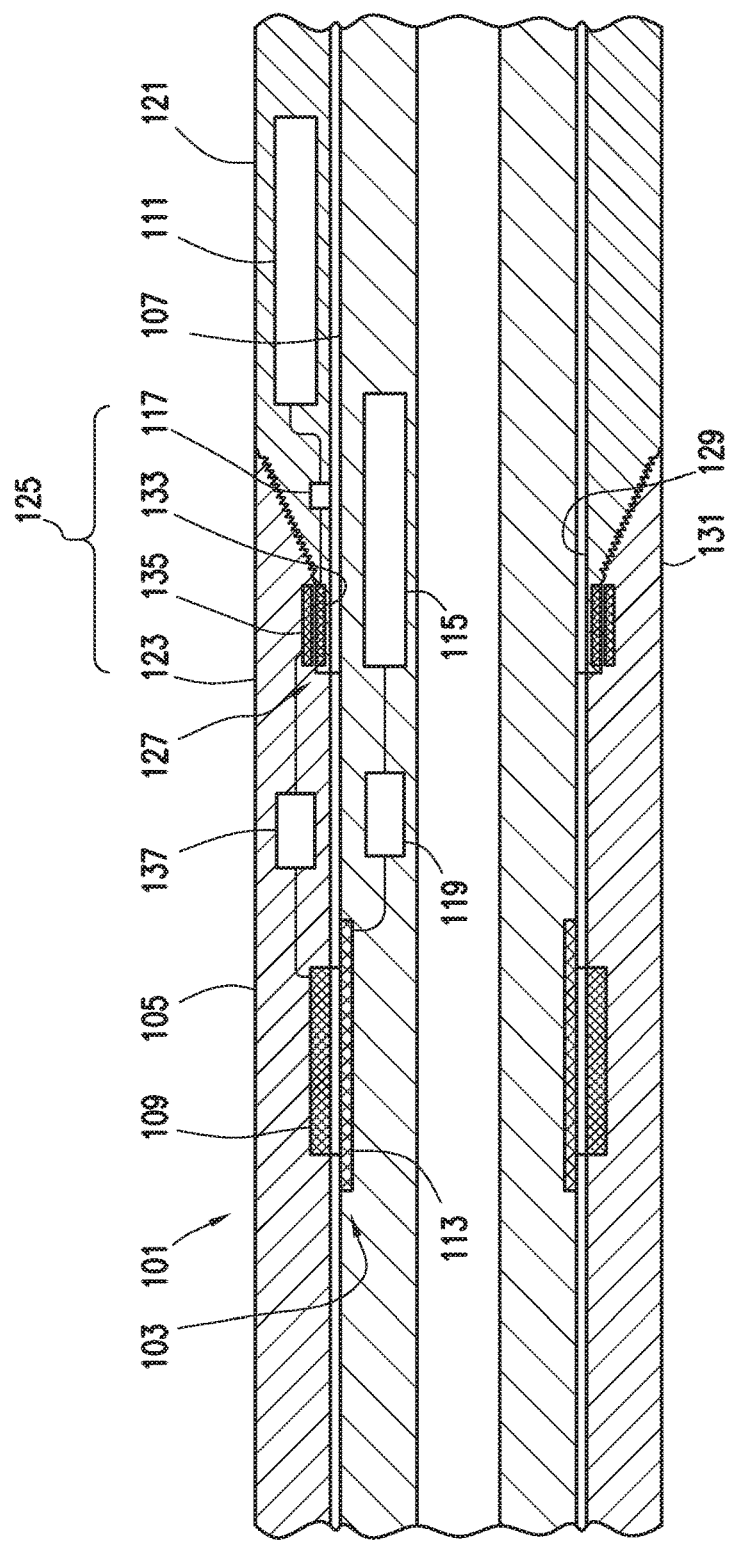
FIG. 4 depicts a cross section view of an inductive coupler consistent with at least one embodiment of the present disclosure.

In some embodiments, data may be transmitted across a threaded connection between subcomponents of downhole tool 101 or different downhole tools 101. For example, in some embodiments, as depicted in FIG. 4, downhole tool 101 may include primary collar 121 as a first subcomponent and intermediate collar 123 as a second subcomponent. In some embodiments, primary collar 121 and intermediate collar 123 may be, for example and without limitation, parts of a motor, turbine, rotary steerable system, MWD, LWD, or drill bit where probe 107 is a mandrel. Primary collar 121 may be coupled to intermediate collar 123 by threaded coupling 125 having inductive coupler 127. Although depicted as part of collar 105, one having ordinary skill in the art with the benefit of this disclosure will understand that primary collar 121 and intermediate collar 123 may be part of any component of downhole tool 101. Threaded coupling 125 may, in some embodiments, include male coupler 129 and female coupler 131 formed on primary collar 121 and intermediate collar 123 respectively.

Figure 4A:
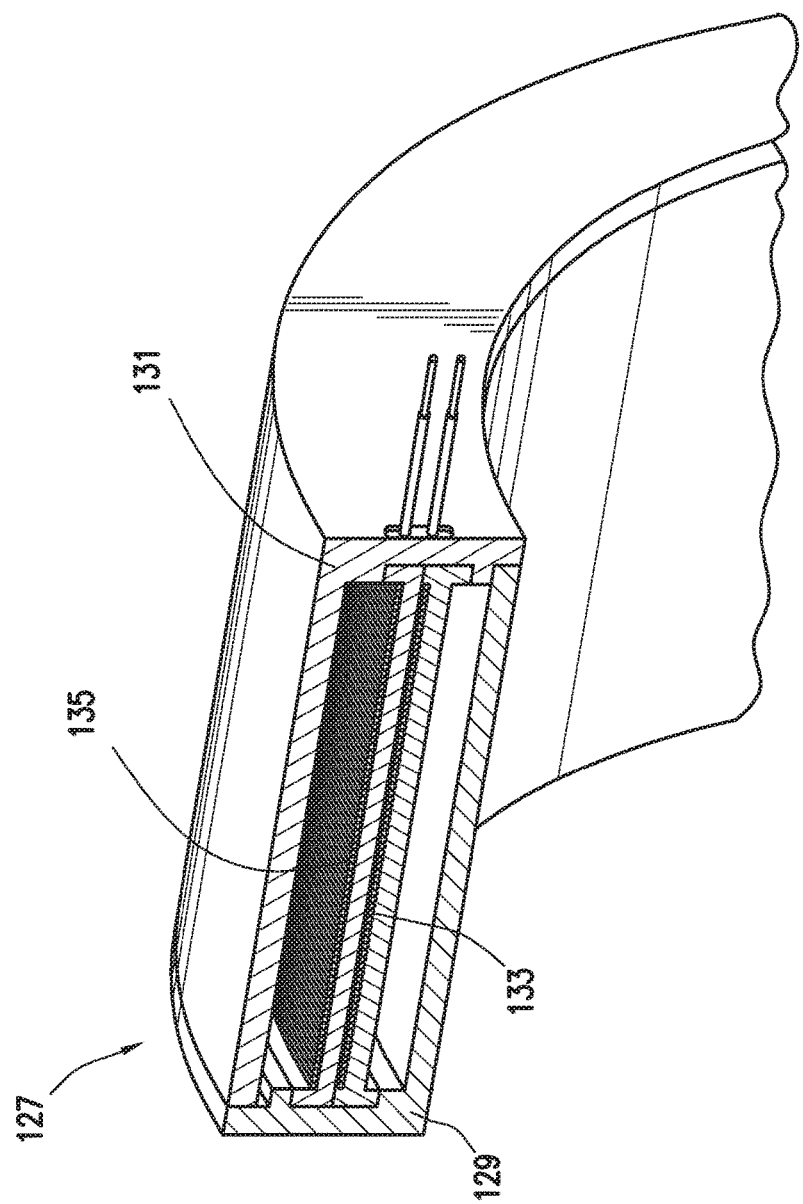
FIG. 4A depicts a partial cross section perspective view of the inductive coupler of FIG. 4.

As depicted in FIG. 4A, inductive coupler 127 may include male coil 133 positioned on male coupler 129 and female coil 135 positioned on female coupler 131. In some such embodiments, when male coupler 129 is engaged with female coupler 131, male coil 133 may be at least partially within female coil 135. In some embodiments, male coil 129 and female coil 135 may operate as described herein above with respect to collar coil 109 and probe coupler 113.

In some embodiments, collar transceiver 111 may be positioned in primary collar 121 and collar coil 109 may be positioned in intermediate collar 123. In some embodiments, inductive coupler 127 may transmit signals generated by collar transceiver 111 or probe transceiver 115 across threaded coupling 125. Although described with respect to a collar, one having ordinary skill in the art with the benefit of this disclosure will understand that inductive coupler 127 may be utilized to transmit data across any threaded connection without deviating from the scope of this disclosure.

Figure 5:
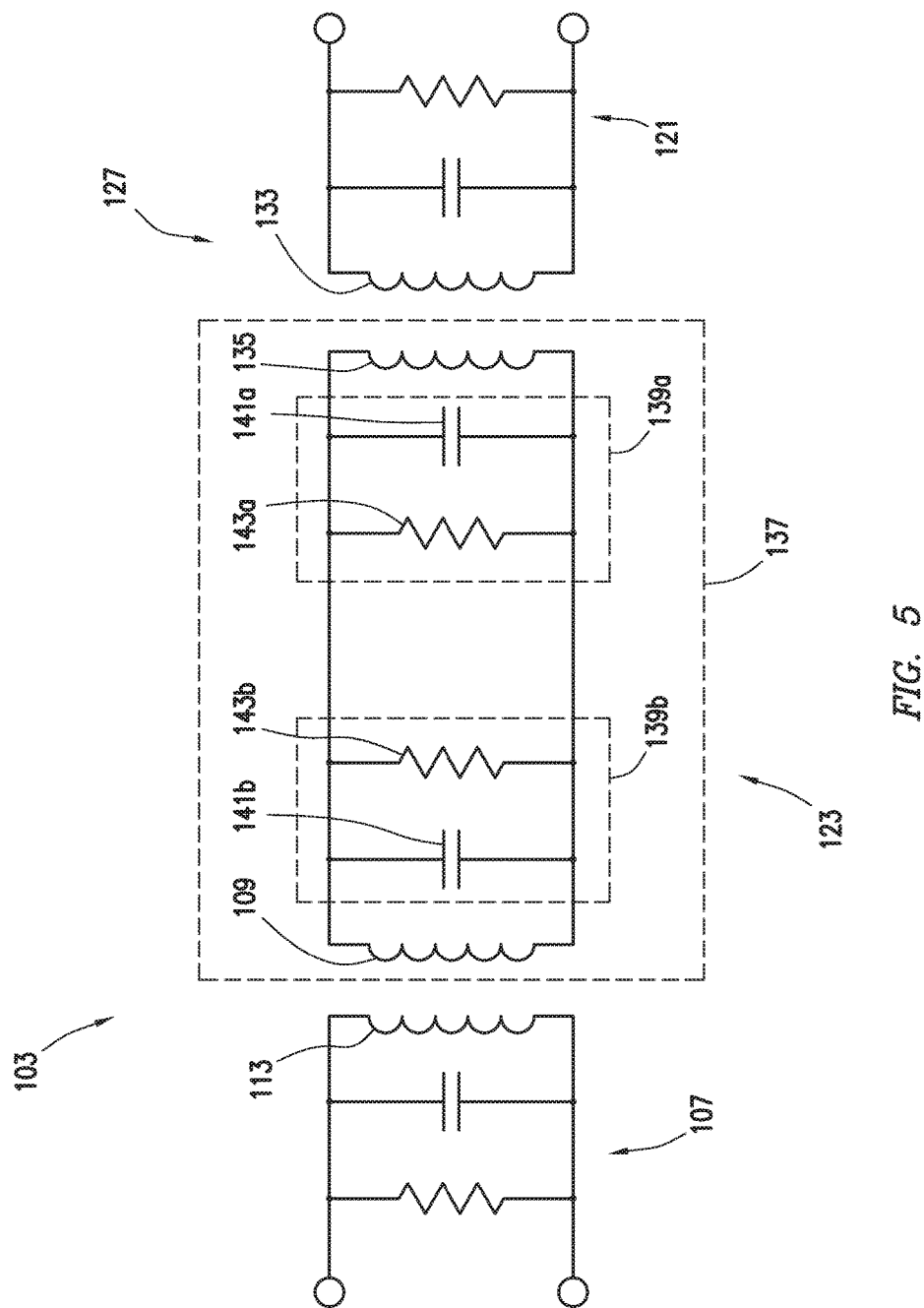
FIG. 5 depicts a schematic of a circuit including a tuning circuit of an inductive coupler consistent with at least one embodiment of the present disclosure.

In some embodiments, intermediate collar 123 may include intermediate tuning circuit 137. Intermediate tuning circuit 137, as depicted in FIG. 5, may operate as described herein above with respect to tuning circuits 117 and 119. In some embodiments, intermediate tuning circuit 137 may include primary tuning circuit 139a which may include one or more components including, for example and without limitation, capacitor 141a and resistor 143a. Primary tuning circuit 139a may be used to tune female coil 135 to male coil 133 as previously described. In some embodiments, intermediate tuning circuit 137 may include secondary tuning circuit 139b, which may be used to tune collar coil 109 to probe coil 113 as previously described. In some embodiments, intermediate tuning circuit 137 of intermediate collar 123 may operate passively, in that intermediate tuning circuit 137 may include no power supply such as a battery within centralizer 145 (described hereinbelow). In some embodiments, intermediate tuning circuit 137 of intermediate collar 123 may include a battery operated repeater. In some embodiments, as discussed herein above, intermediate tuning circuit 137 may include one or more series tank circuits or parallel tank circuits. In some embodiments, as discussed herein above, intermediate tuning circuit 137 may include one or more single-tuned tank circuits or dual-tuned circuits.

Figure 6:
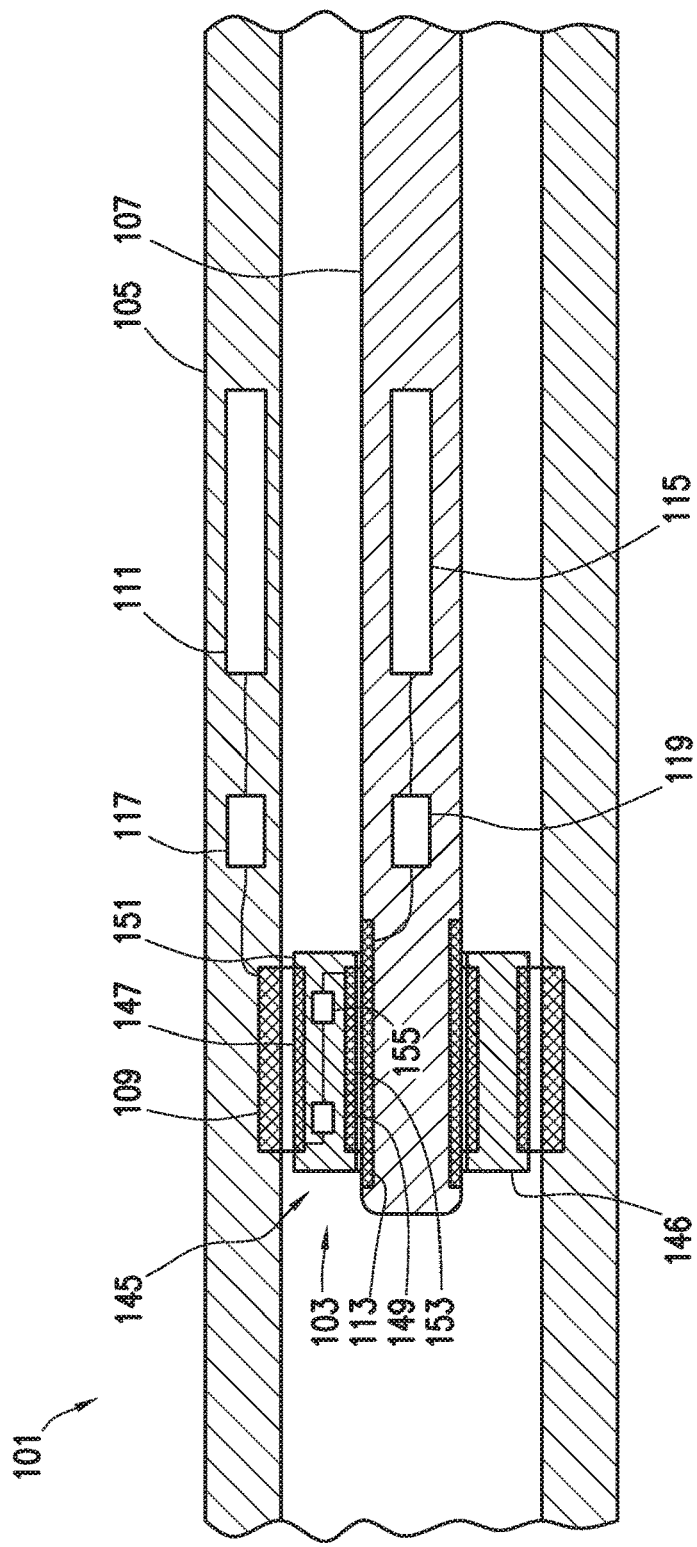
FIG. 6 depicts a schematic view of a coil centralizer consistent with at least one embodiment of the present disclosure.

In some embodiments, as depicted in FIG. 6, centralizer 145 may be positioned between collar 105 and probe 107. Centralizer 145 may, for example and without limitation, support probe 107 within collar 105. Centralizer 145 may include centralizer body 146. In some embodiments, centralizer body 146 may be formed from a nonmagnetic material such as rubber.

In some embodiments, centralizer 145 may be positioned such that it is at least partially within collar coil 109 and probe coil 113 is at least partially within centralizer 145. In some embodiments, centralizer 145 may include outer coil 147 and inner coil 149. Outer coil 147 may be positioned on or near outer surface 151 of centralizer body 146 and inner coil 149 may be positioned on or near inner surface 153 of centralizer body 146. In some embodiments, outer coil 147 and inner coil 149 may be electrically coupled. In some embodiments, centralizer 145 may allow signals and/or low-frequency power generated by collar transceiver 111 or probe transceiver 115 to be transmitted therethrough.

Figure 7:
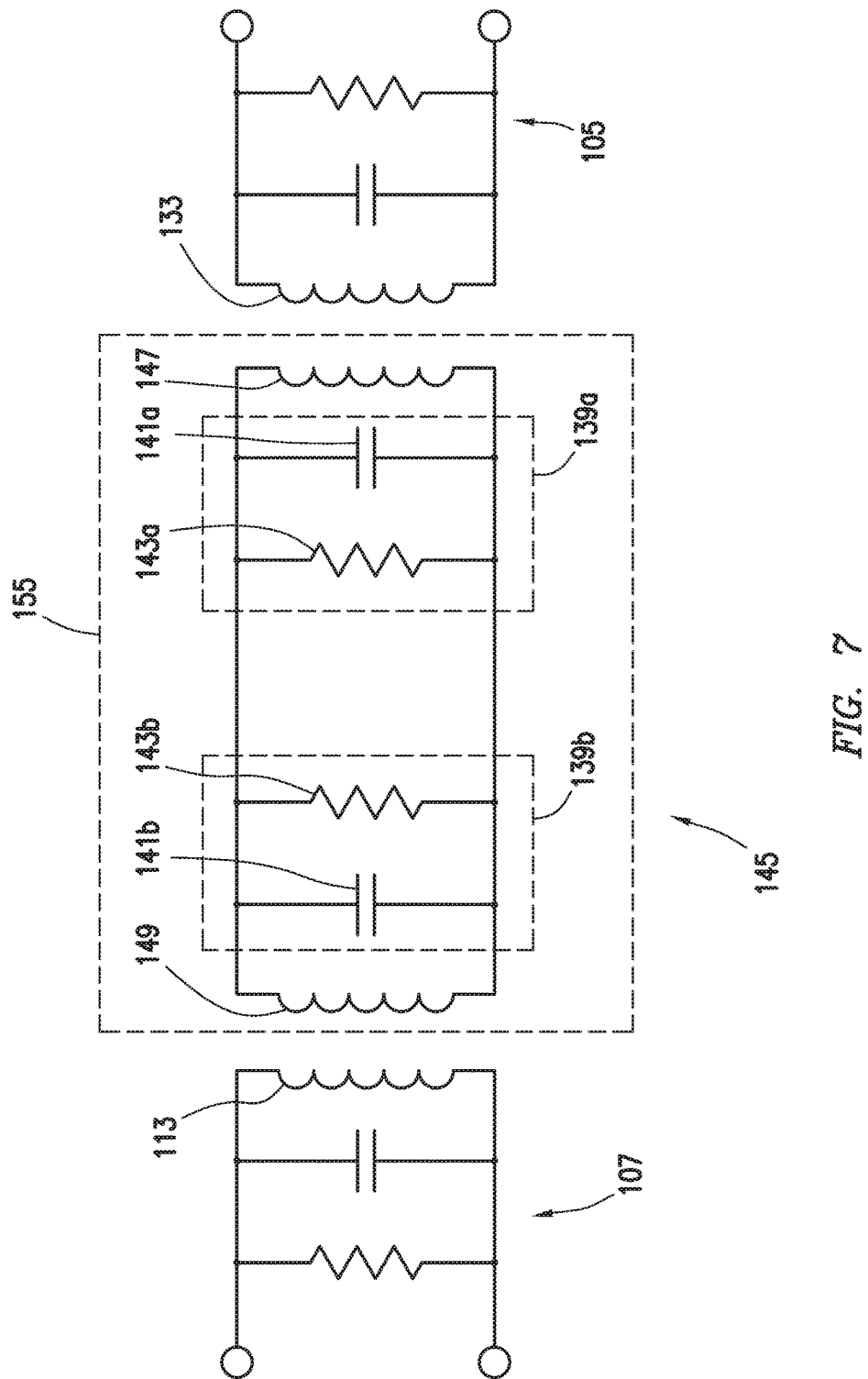
FIGS. 7, 8, 9 depict perspective views of coil centralizers consistent with at least one embodiment of the present disclosure.

In some embodiments, centralizer 145 may include centralizer tuning circuit 155. Centralizer tuning circuit 155, as depicted in FIG. 7, may operate as described herein above with respect to intermediate tuning circuit 137 and may include one or more parallel resonant tanks. In some embodiments, centralizer tuning circuit 155 may include primary tuning circuit 139a which may include one or more components including, for example and without limitation, capacitor 141a and resistor 143a. Primary tuning circuit 139a may be used to tune outer coil 147 to collar coil 109. In some embodiments, centralizer tuning circuit 155 may include secondary tuning circuit 139b, which may be used to tune inner coil 149 to probe coil 113. In some embodiments, centralizer tuning circuit 155 may operate passively, such that centralizer tuning circuit 155 may include no power supply such as a battery. In some embodiments, centralizer tuning circuit 155 may include a battery-operated repeater.

Figure 9:
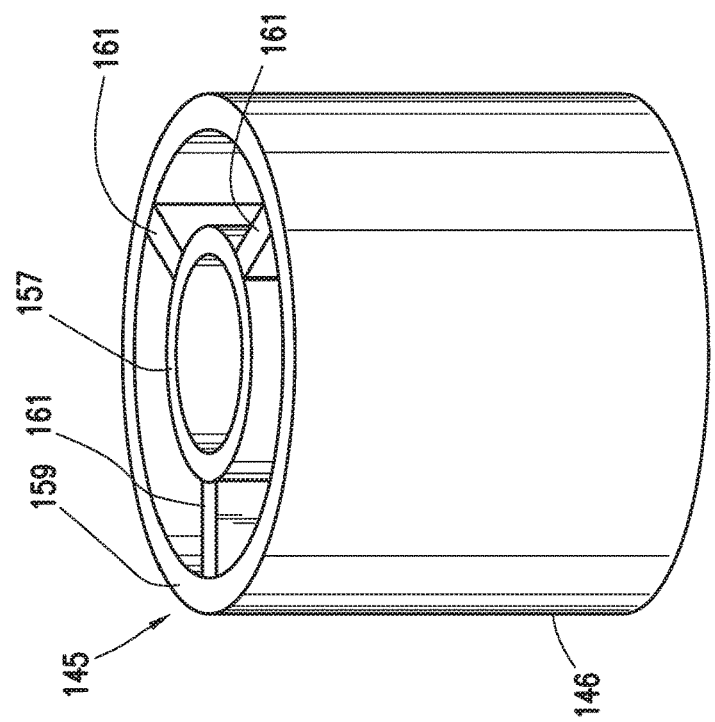
Figure 8:
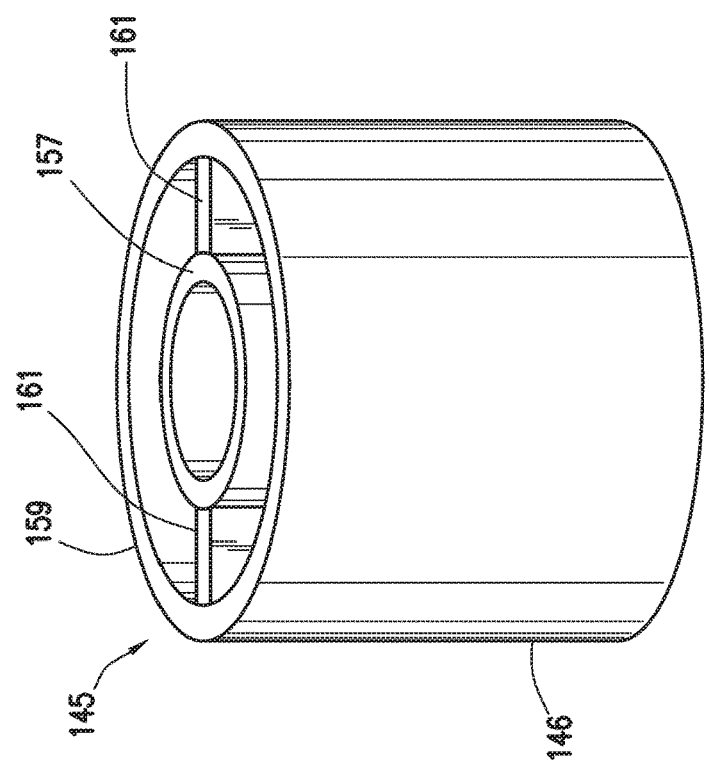

In some embodiments, as depicted in FIGS. 8, 9, centralizer 145 may be generally annular. Centralizer body 146 may, in some embodiments, be formed from inner annular segment 157 and outer annular segment 159. Inner annular segment 157 may be mechanically coupled to outer annular segment 159 by one or more radial spokes 161. For example, in some embodiments, as depicted in FIG. 8, inner annular segment 157 may be mechanically coupled to outer annular segment 159 by two radial spokes 161. In some embodiments, as depicted in FIG. 9, inner annular segment 157 may be mechanically coupled to outer annular segment 159 by three radial spokes 161. In some embodiments, outer coil 147 may be positioned within outer annular segment 159 and inner coil 149 may be positioned within inner annular segment 157. In some embodiments, centralizer tuning circuit 155 may be positioned within inner annular segment 157, outer annular segment 159, radial spokes 161, or a combination thereof. In some embodiments, radial spokes 161 may define flow paths 163 through which fluid may pass between probe 107 and collar 105 through centralizer 145. In some embodiments, In at least one embodiment of the present disclosure, an inductive coupler for a downhole tool may include a first transceiver electrically coupled to a first coil through a first tuning circuit and a second transceiver electrically coupled to a second coil through a second tuning circuit, the second coil positioned substantially concentric with the first coil. The first transceiver may be collar transceiver 111 or probe transceiver 115. The first coil may be collar coil 109, probe coil 113, male coil 133, female coil 135, outer coil 147, or inner coil 149. The first tuning circuit may be collar tuning circuit 117, probe tuning circuit 119, intermediate tuning circuit 137, primary tuning circuit 139a, secondary tuning circuit 139b, or centralizer tuning circuit 155. The second transceiver may be collar transceiver 111 or probe transceiver 115. The second coil may be collar coil 109, probe coil 113, male coil 133, female coil 135, outer coil 147, or inner coil 149. The second tuning circuit may be collar tuning circuit 117, probe tuning circuit 119, intermediate tuning circuit 137, primary tuning circuit 139a, secondary tuning circuit 139b, or centralizer tuning circuit 155.

In some embodiments, the distance between adjacent coil pairs, such as between collar coil 109 and probe coil 113, mail coil 133 and female coil 135, outer coil 147 and collar coil 109, or inner coil 149 and probe coil 113, may, for example and without limitation, be less than 0.5", less than 0.25", or between 0.0625" and 0.25". In some embodiments, collar coil 109, probe coil 113, male coil 133, female coil 135, outer coil 147, or inner coil 149 may be spaced between 0.125" and 0.5" of the edge of the corresponding structure-collar 105, probe 107, male coupler 129, female coupler 131, outer surface 151, or inner surface 153 respectively.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A downhole tool comprising:
   a collar including a primary collar and an intermediate collar;
   a probe positioned within the collar;
   a collar transceiver positioned within the primary collar, the collar transceiver electrically coupled to a male coil through a collar tuning circuit;
   a probe transceiver positioned within the probe, the probe transceiver electrically coupled to a probe coil through a probe tuning circuit;
   a female coil positioned within the intermediate collar; and
   a collar coil positioned within the intermediate collar, the collar coil electrically coupled to the female coil through an intermediate tuning circuit;
   wherein the collar transceiver, collar tuning circuit, male coil, female coil, intermediate tuning circuit, collar coil, probe coil, probe tuning circuit, and probe transceiver are arranged in series.

2. The downhole tool of claim 1, wherein the female coil is substantially concentric with the male coil.

3. The downhole tool of claim 1, further comprising a threaded connection between the primary collar and the intermediate collar, the threaded connection including a male coupler and a female coupler, wherein the male coil is positioned on the male coupler and the female coil is positioned on the female coupler.

4. The downhole tool of claim 1, wherein the collar tuning circuit and probe tuning circuits comprise one or more of parallel resonant tanks or series resonant tanks, and the intermediate tuning circuit comprises one or more of parallel resonant tanks or series resonant tanks.

5. The downhole tool of claim 1, wherein the intermediate tuning circuit comprises a primary tuning circuit and a secondary tuning circuit.

6. The downhole tool of claim 5, wherein the collar tuning circuit has a resonant frequency substantially equal to a resonant frequency of the primary tuning circuit, and the probe tuning circuit has a resonant frequency substantially equal to a resonant frequency of the secondary tuning circuit.

7. The downhole tool of claim 6, wherein the first, second, primary, and secondary tuning circuits each comprise a capacitor.

8. The downhole tool of claim 6, wherein the first and second tuning circuits are single-tuned or dual-tuned.

9. The downhole tool of claim 8, wherein the first and second tuning circuits are dual-tuned, and signal and power is transferred through the inductive coupler.

10. The downhole tool of claim 6, wherein the first and second tuning circuits comprise one or more low-pass filters, high-pass filters, or band rejection filters.

11. The downhole tool of claim 6, wherein the first and second tuning circuits comprise one or more impedance-matching circuits.

12. The downhole tool of claim 1, wherein the collar and probe are components of a motor, turbine, rotary steerable system, MWD, LWD, or drill bit and the probe is a mandrel.

* * * * *